3,407,086
ASBESTOS-CEMENT PRODUCT AND PROCESS
Walter E. Voisinet, Colden, N.Y., assignor to National
 Gypsum Company, Buffalo, N.Y., a corporation of
 Delaware
No Drawing. Continuation-in-part of application Ser.
 No. 299,479, Aug. 2, 1963. This application Apr.
 24, 1967, Ser. No. 632,921
6 Claims. (Cl. 117—72)

ABSTRACT OF THE DISCLOSURE

A process for increasing the durability of decorative finish coatings on asbestos-cement and similar substrates. A resin composition of either a water-dispersed or solvent-base polyamide-epoxy resin system, containing pigments, extenders and other modifying agents, is applied as a primer coating on the asbestos-cement substrate. The resin primer is dried and at least partially cured, and the finish coating applied over the primer. The resin primer coating has excellent adhesion to the substrate and bonds well to the finish coating, thereby providing a decorative asbestos-cement product, suitable for exterior use, which has outstanding durability and performance.

---

This application is a continuation-in-part of co-pending application Serial No. 299,479, filed August 2, 1963, now abandoned.

This invention relates ot a process for treating cement substrates to increase the adhesion of finished coatings to the surface of such a substrate. More particularly, it relates to a process for coating asbestos-cement and similar substrates with a resin primer prior to applying a finish coating in order to provide improved lasting adhesion and durability of the finish coating.

Asbestos-cement products possess characteristics which make them desirable as building material, for such products are incombustible, durable, and corrosion resistant. Accordingly, asbestos-cement products are commonly used on exterior surfaces of building in the form of shingles, siding, clapboards, and the like. In recent years, it has been desired, for economic and aesthetic reasons, to provide such asbestos-cement products with a decorative finish coating. In the past, however, it has been extremely difficult to provide a durable, weather-resistant, decorative coating on asbestos-cement products, for the coatings tended to fail by chipping or flaking off after only short periods of exposure. This failure of the decorative coating is due to the nature of the asbestos-cement substrate which is particularly poor for coatings. Thus, upon exposure to water and/or water vapor, the asbestos-cement substrate is softened and swells. Upon drying, the substrate shrinks. This repeated movement of the asbestos-cement disrupts and weakens the bonding of the decorative coating to the substrate so that the coating has poor adhesion and, consequently, poor durability. In addition, metallic oxides present in the cement after manufacture combine with absorbed water or water vapor to form basic compounds which migrate to the surface of the substrate and chemically attack the coating material, especially at the interface, thereby weakening or destroying the bond of the coating to the substrate.

Heretofore, attempts to provide a durable, weather resistant coating on asbestos-cement substrates have been directed primarily to seeking a finish coating material which was capable of withstanding the deleterious effects of wind and weather as well as overcoming the coating problems peculiar to asbestos-cement substrates. The present invention, however, is directed to treating the substrate to eliminate these problems at the source rather than attempting to overcome them by altering only the coating itself.

It is therefore an object of the present invention to provide a process for treating asbestos-cement and similar substrates to increase the durability of finish coatings applied thereto.

Another object of the invention is to provide a process for increasing the durability of decorative finish coatings on asbestos-cement substrates.

Another object is to provide a primer coating on asbestos-cement substrates for improving the durability of decorative finish coating to the substrate.

Another object is to provide an asbestos-cement product having on the surface thereof, a decorative finish coating having lasting adhesion and durability.

These and other objects and advantages will become apparent from the following description of the invention.

According to the present invention, the adhesion and durability of finish coatings to asbestos-cement substrates is improved by applying a primer coating of a polyamide-epoxy resin system on the substrate prior to the application of the finish coating. It has been found that by applying the polyamide-epoxy resin system as a primer coating on the asbestos-cement substrate, a lasting adhesion of almost any finish coating can be obtained. The polyamide-epoxy resin primer itself is not a good finish coating for it has a tendency to chalk. However, this resin system bonds very well to the asbestos-cement substrate and has excellent alkali resistance. As a result, the primer coating protects the finish coating from the mechanical movement of the substrate resulting from exposure to water, and from chemical attack by the basic oxides migrating to the surface of the substrate.

Any convenitonal epoxy resin and polyamide resin may be used in this invention. Exemplary of epoxy resins which may be used are "Epon" resins obtained from the Shell Chemical Corporation, which comprise condensation products of epichlorohydrin and bis-phenol A, and "Araldite" resins and resin solutions obtained from Ciba Products Company. Similarly, any conventional polyamide resin may be used in the primer composition. Such resins are prepared by methods well known in the art through the condensation of dimer acids with polyamines. Among the polyamide resins which may be used in this invention are "Versamid" resins and resin solutions obtained from General Mills, Inc. It is to be understood that other suitable epoxy resins and polyamide resins may also be used in this invention.

The resin system may be applied on the asbestos-cement substrate either as a water-dispersed or a solvent based system. Both systems are effective in forming a primer coating on the substrate, and both systems adhere equally well to the substrate. However, it is generally preferred to use a solvent-base primer system for it dries faster than a water-dispersed system, thereby permitting faster fabricating speeds. In addition, the use of a solvent base system makes it possible to apply a thicker primer coating, incorporating fillers, so that better bridging of surface imperfections in the substrate can be obtained. Suitable solvents which may be used with the polyamide-epoxy resins include methyl isobutyl ketone, methyl isoamyl ketone, Cellosolve acetate, toluene, xylene and the like, including mixtures of such solvents.

Various additives may also be incorporated in the primer composition. For example, fillers, pigments, surfactants. emulsifiers, and other modifying agents may be included.

The resin composition is applied on the substrate, as by spraying, to deposit a uniform coating thereon. While the amount of resins coated on the substrate may vary, it is preferred that the primer be applied at a rate sufficient to provide a dry loading of about 10 to 15 grams of resin per square foot for the solvent-base system, and about 7 to 10 grams of resin per square foot for the water-dispersed system.

It has been found that preheating the substrate prior to the application of the primer aids in good film formation of the primer coating. Good results have been obtained by heating the substrate to a surface temperature of about 120° to 150° F., and preferably about 140° F. Temperatures outside this range may, of course, also be used, as long as such temperatures do not adversely affect the film formation of the primer. Too high temperatures should be avoided for it may result in poor leveling, pinholes and blisters in the primer coating.

After application of the primer coating, the resin coating is dried and cured or dried and only partially cured. The volatile material present in the primer composition, such as water, resin solvents, and the like, should be removed from the film before appreciable curing takes place in order to obtain proper film formation. Preferably, drying and at least a partial cure of the resins is obtained by heating the coated substrate in an oven at a temperature in the range of from about 250° F. to about 450° F. Temperatures above or below this range may, of course, be used if desired.

When the resin primer coating is dry and at least partially cured, a finish coating may be sprayed or otherwise applied on the sheet. Any conventional finish coating material suitable for the desired end use of the product may be used. Suitable finish coatings includes water-base latex paints, such as an aqueous emulsion of a thermoplastic or thermosetting resin; solvent-base paints, for example paints containing vinyl resins such as vinyl chloride, vinyl acetate, vinylidene chloride, and the like, acrylic and methacrylic resins such as acrylonitrile, methacrylonitrile; vinylacrylic copolymers, and the like. The finish coating, which may contain pigments, extenders, fillers, plasticizers, and other modifying agents is applied, as by spraying, at a loading of about 7 to 12 wet grams per square foot. This loading provides a finish coating having a thickness of about 1.0 to 3.0 mils. Loading outside of this range may be used, as long as the resulting finish coating is satisfactory. The finish coating is then heated to cure or coalesce the resins, and to complete the cure of the polyamide-epoxy resins of the primer coating, thereby to integrally bond the finish coating to the primer coating. Excellent results have been obtained when the finish coating is applied over a primer coating which has been only partially cured. According to this embodiment of the invention the primer coating is dried and only partially cured prior to the application of the finish coating. After the finish coating has been applied, the product is heated to simultaneously cure the resins in the finish coating and complete the cure of the polyamide-epoxy resins in the primer coating. In this manner the finish coating is integrally bonded to the primer coating.

The following embodiments are illustrative of the present invention, but it is to be understood that the present invention is not to be limited to the materials, proportions, or conditions set forth therein.

EXAMPLE 1

A water-dispersed resin composition suitable for use as a primer coating on asbestos-cement substrates was prepared having the following components and composition:

Component A

| Ingredients: | Amount (lbs.) |
|---|---|
| Epoxy resin solution (obtained under trade designation "Araldite 571 KX" from Ciba Products Corp.) | 74.0 |
| Methyl isobutyl ketone | 20.0 |
| Titanium dioxide pigment | 37.0 |
| Diatomaceous silica extender | 20.7 |

Component B

| | |
|---|---|
| Polyamide resin solution (obtained under trade designation "Versamid 401" from General Mills, Inc.) | 92.5 |
| Glacial acetic acid | 0.8 |

Component C

| | |
|---|---|
| Methyl isobutyl ketone | 20.0 |

Component D

| | |
|---|---|
| Water | 150.0 |
| Total | 415.0 |

Component A was prepared by introducing the epoxy resin solution into a mixer and then adding the pigment and extender. During this addition, the methyl isobutyl ketone was added to assure adequate wetting of the pigments. In a separate container, the glacial acetic acid was added, with agitation to the polyamide resin solution to make the mixture emulsifiable, thereby forming Component B. Components A and B separately are stable indefinitely but have a shelf life of about two days when mixed together. Components A, B and C were mixed thoroughly in a Cowles Dissolver Unit, and the water, Component D, was added under high speed agitation to the mixture to form the water-dispersed resin composition.

This polyamide-epoxy water-dispersed resin composition was then applied, by spraying, as a primer coating on a sheet of asbestos-cement. Thus, the asbestos-cement sheet was preheated, and the resin composition sprayed on the substrate to provide a wet loading of 20 grams per square foot. The sheet was then air dried for several minutes and then passed through an oven having a temperature of between 250° to 350° F. to dry and at least partially cure the resins.

A conventional solvent-base, vinyl chloride polymer finish coating was then sprayed on the primed sheets at a wet loading of between 9 to 12 grams per square foot, and the sheets dried at a temperature of between about 150° and 250° F. to form a satisfactory coating on the sheets. The finish coating had excellent adhesion and durability upon exposure to weathering conditions.

EXAMPLE 2

A solvent-base resin primer composition was prepared having the following components and composition:

Component A

| Ingredients: | Amount (lbs.) |
|---|---|
| Epoxy resin solution (obtained under trade designation "Araldite 571 KX" from Ciba Products Corp.) | 88.8 |
| Titanium dioxide pigment | 18.0 |
| Diatomaceous silica extender | 15.0 |
| Barytes #1 | 36.0 |
| Wet ground mica (325 mesh) | 30.0 |
| Cellosolve acetate | 36.0 |
| Silicone resin solution ("Silicone R-12" obtained from Union Carbide Corporation) | 4.8 |

Component B

| | |
|---|---|
| Polyamide resin solution (obtained under trade designation "Versamid 401" from General Mills, Inc.) | 111.0 |
| Amorphous silica | 36.0 |
| Wet ground mica (325 mesh) | 30.0 |
| Cellosolve acetate | 27.0 |

Component C

| | |
|---|---|
| Cellosolve acetate | 61.0 |
| Xylene | 61.0 |
| Total | 554.6 |

Component A was prepared by charging the epoxy resin solution into a paste mixer and adding the other components in the order specified. Component B was prepared by introducing the polyamide resin solution into a mixer and then adding the other components, with agitation, in the order specified, the Cellosolve acetate being added in small portions. The Cellosolve acetate and xylene of Component C were mixed in a suitable container, with agitation, to provide this component. The primer composition was prepared by blending Components A and B and then adding, in small portions, Component C. Primer compositions prepared in this manner have a pot life of about 48 hours.

The solvent-base resin composition was applied to a sheet of asbestos-cement by spraying the composition, at a temperature of about 80° F., on the surface of a sheet of asbestos-cement at a rate which provided a loading of 10 to 14 dry grams per square foot. The asbestos-cement substrate was preheated to a surface temperature of about 140° F. prior to the application of the resin composition. The resin coated substrate was then passed through a multi-zone oven which was at a temperature of between about 300° and 450° F. for a period of time sufficient to dry and at least partially cure the resins. The resulting resin primer coating, which had a thickness of between about 2.0 to 3.5 mils, was free from surface imperfections.

A finish coating having a vehicle containing a vinyl chloride polymer binder and a mixture of organic solvents for the binder, was applied on the resin-primed asbestos-cement sheet. Thus, the sheet was preheated to a surface temperature of about 140° F. and the coating composition sprayed on at a wet loading of between about 9 to 12 grams per square foot, and the sheets passed through an oven having a temperature of between 150° and 250° F. Asbestos-cement sheets primed and coated in this manner showed good film integrity after exposure to weathering conditions for extended periods, with no cracking, peeling, chipping or other failure of the finish coating.

While the disclosure has been directed primarily to the treatment of asbestos-cement substrates, it is to be understood that the present invention is also applicable to the treatment of oher suitable substrates such as, for example, lime-silica substrates, asbestos-cement which has been modified by the inclusion of cellulose fibers, and the like.

Modifying agents, other than those specifically set forth hereinabove, may also be used in the primer composition. For example, surface active agents may be incorporated in the epoxy resin portion of the composition in order to prevent settling of the pigment grind upon storage. As noted above, finish coatings other than the vinyl chloride polymer coating of the examples may be applied over the dried primer. Thus, other conventional solvent-base paints and water-base latex paints have been found to provide satisfactory finish coatings on the sheets.

It will be understood that various changes in the details, materials, steps and arrangements, which have been herein described, may be made by those skilled in the art, within the principle and scope of the invention as set forth in the appended claims:

I claim:
1. A process for producing an asbestos-cement product having a durable, weather-resistant finish coating thereon, which comprises
    applying to the surface of an asbestos-cement sheet a substantially uniform coating of a resin composition selected from the group consisting of water-dispersed and solvent-base polyamide-epoxy resins, said composition being applied at a rate sufficient to provide a dry loading of from about 7 to 15 grams of resin per square foot,
    heating the resin-coated sheet for a period of time sufficient to dry and partially cure the resins, whereby a substantially continuous resin primer coating is formed on the sheet, said coating having excellent adhesion to the sheet,
    applying a vinyl resin finish coating on the surface of the resin primer coated sheet,
    and heating said sheet to complete the cure of the resin primer and to cure the vinyl resin finish coating thereby integrally bonding the finish coating to said primer coating.
2. The process as defined in claim 1 in which said resin composition is applied to the asbestos-cement sheet by spraying, said sheet having a surface temperature of between about 125° and 150° F. when the resin composition is sprayed thereon.
3. The process as defined in claim 2 in which the resin composition is sprayed on the asbestos-cement sheet at a rate sufficient to provide a resin coating of between about 2.0 and 3.5 mils thickness on said sheet.
4. A durable, decorative, weather-resistant asbestos-cement product which consists essentially of
    a polyamide-epoxy resin primer coating bonded to the surface of an asbestos-cement sheet, and
    a weather-resistant vinyl finish coating overlying and integrally bonded to said primer coating.
5. The asbestos-cement product defined in claim 4 in which the resin primer coating has a thickness of about 2.0 to 3.5 mils, and the finish coating has a thickness of about 1.0 to 3.0 mils.
6. The asbestos-cement product defined in claim 4 in which said vinyl finish coating contains a vinyl resin selected from the group consisting of vinyl chloride, vinyl acetate, vinylidene chloride, acrylic and methacrylic resins.

References Cited
UNITED STATES PATENTS

| | | | |
|---|---|---|---|
| 2,589,245 | 3/1952 | Greenlee | 117—161 |
| 2,861,897 | 11/1958 | Hendrixson | 117—47 |
| 2,880,116 | 3/1959 | Alps et al. | 117—161 X |
| 2,934,452 | 4/1960 | Sternberg | 117—161 X |
| 2,972,553 | 2/1961 | Hess | 117—47 |
| 3,011,412 | 12/1961 | Harrington et al. | 117—161 |
| 3,075,857 | 1/1963 | Fior et al. | 117—76 |
| 3,150,112 | 9/1964 | Toy | 117—123 X |
| 3,258,356 | 6/1966 | Caldwell et al. | 117—72 |

WILLIAM D. MARTIN, *Primary Examiner.*
R. HUSACK, *Assistant Examiner.*